United States Patent [19]

Rideout, Jr. et al.

[11] Patent Number: 5,367,524
[45] Date of Patent: Nov. 22, 1994

[54] METHOD FOR SEQUENTIAL DATA TRANSMISSION

[75] Inventors: Kenneth E. Rideout, Jr., Vernon Hills; Donald C. Mills, Glenview, both of Ill.

[73] Assignee: Motorola, Inc., Schaumburg, Ill.

[21] Appl. No.: 62,032

[22] Filed: May 17, 1993

Related U.S. Application Data

[63] Continuation of Ser. No. 739,953, Aug. 5, 1991, abandoned.

[51] Int. Cl.$^5$ .............................................. H04J 3/06
[52] U.S. Cl. ................................................ 370/104.1
[58] Field of Search .................. 370/95.1, 95.3, 100.1, 370/104.1; 342/356, 357

[56] References Cited

U.S. PATENT DOCUMENTS 3,924,187  12/1975  Dormans .......................... 370/100.1
4,086,537  4/1978   Asakawa et al. .................. 370/100.1
4,107,608  8/1978   Saburi ................................ 370/95.3
4,591,730  5/1986   Pennoni ............................. 370/95.3
4,777,633  10/1988  Fletcher et al. ..................... 370/109
5,068,916  11/1991  Harrison et al. .................. 370/100.1

Primary Examiner—Douglas W. Olms
Assistant Examiner—Min Jung
Attorney, Agent, or Firm—Timothy W. Markison

[57] ABSTRACT

Sequential data transmission by a plurality of communication units may be achieved in a communication system by using an accurate external clock and transmitting at predetermined time intervals or time slots. By using a GPS clock signal as the external clock, a communication system may determine a cycle time and duration of time slots such that each communication unit is allocated a time slot for data transmission. This approach eliminates the need for polling of communication units and substantially reduces data congestion on control channels of the communication system.

9 Claims, 1 Drawing Sheet

METHOD FOR SEQUENTIAL DATA TRANSMISSION

This is a continuation of application Ser. No. 07/739,953, filed Aug. 5, 1991 and now abandoned.

FIELD OF THE INVENTION

This invention relates generally to communication systems and in particular to a method for allowing communication units to sequentially transmit data to desired targets.

BACKGROUND OF THE INVENTION

A typical wireless communication system comprises a central controller, a plurality of base stations which transceive communication resources, and a plurality of communication units. A communication unit may be a portable radio, a mobile vehicle radio, a portable cellular telephone, and/or a data transmission unit. In addition, a communication resource may be a frequency, a frequency pair, a TDM time slot or another type of modulated signal carrier. When a substantial number of communication units have data to transmit to a target, where a target could be another communication unit or the central controller, a typical communication system polls the communication units to control the transmission of data.

A typical polling sequence comprises the central controller prompting each of the communication units sequentially and allocating them a predetermined period of time to transmit their data. This approach requires a substantial amount of data signals to be conveyed on a communication resource between the central controller and communication units, thereby reducing the overall efficiency of the communication system.

Another type of polling gives priority to specific events such as emergency conditions. In a priority polling scheme the central controller periodically transmits an indicator that a priority data time slot is upcoming. If a communication unit has priority data, it transmits the priority data to the central controller in response to the prompting. This improves time response for priority data in a polling sequence, however, it still requires a substantial amount of communication on a control channel between the central controller and the communication units to prompt the communication units to transmit their data.

Therefore, a need exists for a method that allows the communication units to sequentially transmit their data in an organized manner and to reduce communication on a control channel between the central controller and the communication unit.

SUMMARY OF THE INVENTION

These needs and others are substantially met by the method for sequential data transmission disclosed herein. In a wireless communication system that comprises a plurality of communication units, a method for sequential transmission of data by at least some of the plurality of communication units may be obtained. To achieve this, a selected time cycle is divided into a predetermined number of transmission time slots having a predetermined duration. Once the selected cycle time and transmission time slots have been determined, the central controller allocates at least one transmission time slot to at least one of the at least some of the communication units. The communication units are synchronized with a clock signal and transmit their data when their allocated transmission time slots occur in the selected cycle time.

DESCRIPTION OF A PREFERRED EMBODIMENT

Figure 1:
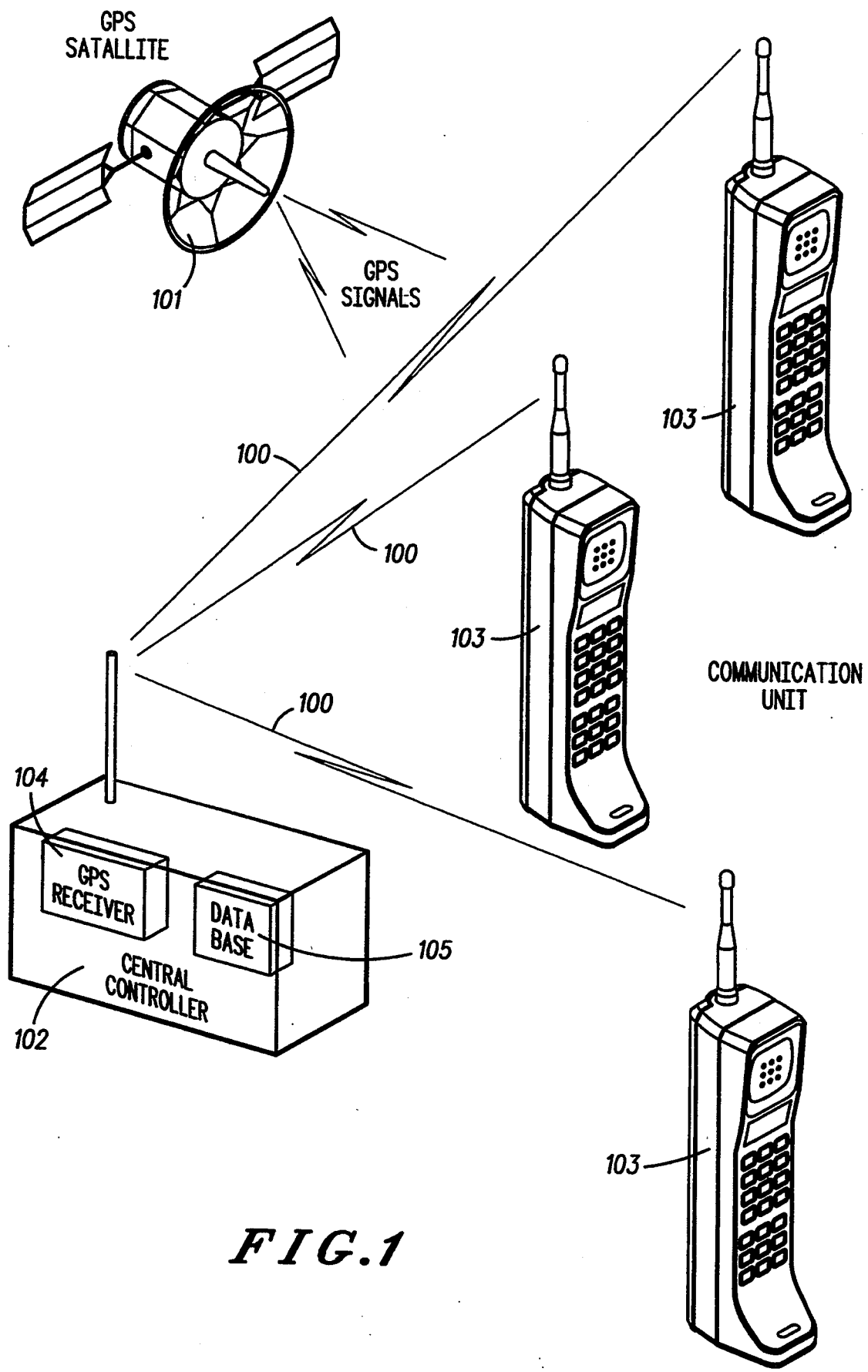
FIG. 1 illustrates a global positioning system (GPS) satellite and a wireless communication system which incorporates the present invention.

FIG. 1 illustrates a communication system 100 and a global positioning system (GPS) satellite 101. The communication system 100 comprises a central controller 102 and a plurality of communication units 103 (only 3 shown). Each of the communication units comprises a GPS receiver (not shown) and sufficient memory and processing capabilities to incorporate the present invention (memory and processor not shown). The central controller comprises a data base 105 which may be a RAM or other electronic storage means, and standard controller capabilities to coordinate transmission between the communication units and the central controller. The central controller 102 may also comprise a GPS receiver 104 such that it may receive the clock signal transmitted by the GPS satellite. The data base maintains a list of which communication units are allocated to which time slots. The data base is dynamic such that new communication units and time slot allocations may added or deleted from it at any time.

In general, the GPS satellite transmits a plurality of signals from which a very accurate clock signal can be ascertained. Each communication unit contains a GPS receiver that receives signals from the GPS satellite including the clock signal. [For the purposes of this discussion only the clock signal is of interest.] By having a very accurate clock signal, each communication unit can be synchronized with the clock signal such that it will precisely know when it is time for it to transmit its data. By selecting a cycle time during which all communication units may transmit their data, and determining the number of time slots that the cycle time will have, a communication unit will know precisely when it is time to transmit data. This approach eliminates the need for the central controller to prompt or poll a communication unit to transmit its data thereby freeing a communication resource to carrying other functional information.

As an example, assume that the cycle time for all the communication units to transmit their data is one minute, and there are six hundred predetermined time slots such that each time slot has a duration of 100 milliseconds. When a communication unit enters the communication system, the central controller will allocate the communication unit at least one time slot wherein the time slot will be identified by time. For example, if the central controller allocates a communication unit the 11th time slot, the communication unit will know that one second after every minute is its time to transmit data but only for the 100 millisecond time slot. Similarly, when a communication unit leaves the communication system, the central controller may deassign the predetermined time slot or slots such that they may be used by other communication units.

Continuing with the above example, the selected cycle time may be further divided into equal sections. For example, the 600 time slots may be divided into 4 sections of 150 each. This may be advantageous when there are less than 150 communication units registered to the communication system. This way, each communication unit may be allocated four time slots during the selected time cycle such that the efficiency of the cycle time is maximized. In addition, predetermined time slots may be allocated as priority transmission time slots such that when a priority condition arises for a communication unit it does not have to wait until its allocated time slot occurs, it can use a priority time slot. Further, additional time slots may be reserved as priority time slots for log on or log off of communication units such that communication units may register or deregister from the communication system.

As an alternate example, several communication units may be allocated to the same time slot which improves the usage of a communication resource. This approach is well suited for use in a communication system that employs multiple site frequency re-use patterns. At times, the communication units may transmit overlapping data rendering the data messages unreadable. Thus, this approach is best suited for transmission of noncritical data.

By having the clock signal provided by a GPS satellite, there may be times when a communication unit may be incapable of receiving the GPS signal. In order for the communication unit to maintain its capability to transmit data in its allocated predetermined time slot, the communication unit is equipped with an internal clock (not shown). The internal clock, which needs to be accurate for a predetermined time in the range from a few seconds to several hours, provides a clock signal for onboard processing and maintains synchronization when the GPS clock signal is absent. When the GPS clock signal is present, the internal clock is synchronized to it. Note that as the internal clock stability is increased the required guardband is decreased, where guardband is a buffer time between each time slot to insure that data transmission does not overlap.

To enhance the efficiency of data transmission, the ID of the target and the ID of the transmitting communication unit may be omitted from the data transmitted if the target is the central controller. This can be achieved because the central controller, via the data base, knows which communication unit is transmitting at any given time, thus there is no need to transmit the ID of the communication unit. If, however, the target is another communication unit or data is transmitted during a priority time slot, the data packet transmitted must contain at least the ID of the transmitting unit.

To further improve the efficiency of the present invention, the communication units may activate their transmitter at a predetermined time prior to their slot being active. For example, if the communication unit knows that one second after each minute it is going to transmit and it knows that it takes, at a minimum, 10 milliseconds for the transmitter to prepare to transmit, it can be programmed to turn on the transmitter 10 milliseconds before its allocated time slot such that when its allocated time slot is active it can transmit data with minimal delay. The term active in the context of this discussion is when it's time for a particular communication unit to transmit in its time slot.

Although, the present invention has been primarily discussed with reference to a particular example, other variations of this invention may be readily apparent to a person skilled in the art. For example, the selected cycle time may be varied, the predetermined time slots for particular communication units may be of different lengths and other priority transmission techniques may be incorporated.

We claim:

1. In a wireless time division multiplexing (TDM) communication system that comprises at least two communication units and at least one TDM communication resource that is divided into at least two time slots, wherein each of the at least two communication units includes a global positioning system (GPS) receiver, and wherein a first communication unit of the at least two communication units is allocated a first time slot of the at least two time slots and a second communication unit of the at least two communication units is allocated a second time slot of the at least two time slots, a method for sequentially transmitting data by the at least two communication units, the method comprises the steps of:
    a) synchronizing, via the GPS receiver, the at least two communication units to a clock signal that is produced by a global positioning system;
    b) determining, by the first communication unit when the first time slot occurs within the TDM communication resource based on the clock signal;
    c) determining, by the second communication unit when the second time slot occurs within the TDM communication resource based on the clock signal; and
    d) transmitting, by the first communication unit and the second communication unit, data during the first time slot and the second time slot, respectively.

2. The method of claim 1 further comprises allocating at least one predetermined time slot as a priority data time slot.

3. The method of claim 1 further comprises maintaining a database to record which of the predetermined number of time slots each of the at least two communication units is allocated to.

4. The method of claim 3 further comprises deleting the allocation of at least one predetermined time slot to a communication unit when that communication unit becomes inactive.

5. In a wireless communication system that comprises a plurality of communication units, wherein each of the plurality of communication units includes a global positioning system receiver, wherein a global positioning system provides a clock signal, and wherein the plurality of communication units sequentially transmits data to a target during its allocated predetermined time slot of a selected cycle time, a method for a communication unit of the plurality of communication units to transmits its data, the method comprises the steps of:
    a) monitoring the clock signal when the clock signal is available;
    b) determining when its allocated predetermined time slot is active based on the clock signal;
    c) transmitting data to the target when the communication units allocated predetermined time slot is active.

6. In the method of claim 5, step (a) further comprises using an internal clock to maintain synchronization when the clock signal is not available.

7. In the method of claim 6, step (a) further comprises synchronizing the internal clock with the clock signal when the clock signal is available.

8. The method of claim 5 further comprises enabling a transmitter of the communication unit prior to when its allocated predetermined time slot is active such that the transmitter is ready to transmit when the allocated predetermined time slot is active.

9. The method of claim 5 further comprises transmitting priority data during a priority time slot when a priority condition arises.

* * * * *

Adverse Decisions In Interference

Patent No. 5,367,524, Kenneth E. Rideout Jr., Donald C. Mills, METHOD FOR SEQUENTIAL DATA TRANSMISSION, Interference No. 103,759, final judgment adverse to the patentees rendered December 19, 1997, as to claims 1-4 and 5-9.
*(Official Gazette October 27, 1998)*